United States Patent
Ghelardoni et al.

(10) Patent No.: US 12,331,790 B2
(45) Date of Patent: Jun. 17, 2025

(54) CLUTCH

(71) Applicant: PIAGGIO & C. S.P.A., Pontedera (IT)

(72) Inventors: Marco Ghelardoni, Pontedera (IT); Francesco Mennella, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 17/912,093

(22) PCT Filed: Mar. 10, 2021

(86) PCT No.: PCT/IB2021/051993
§ 371 (c)(1),
(2) Date: Sep. 16, 2022

(87) PCT Pub. No.: WO2021/186293
PCT Pub. Date: Sep. 23, 2021

(65) Prior Publication Data
US 2023/0160440 A1 May 25, 2023

(30) Foreign Application Priority Data
Mar. 16, 2020 (IT) .......................... 102020000005533

(51) Int. Cl.
*F16D 13/56* (2006.01)

(52) U.S. Cl.
CPC ........ *F16D 13/56* (2013.01); *F16D 2013/565* (2013.01); *F16D 2300/22* (2013.01)

(58) Field of Classification Search
CPC .... F16D 13/04; F16D 23/12–2023/123; F16D 13/52–2013/565; F16D 2300/22; F16H 57/0006
See application file for complete search history.

(56) References Cited

U.S. PATENT DOCUMENTS

| | | | |
|---|---|---|---|
| 8,627,938 B2 * | 1/2014 | Kataoka | F16D 13/56 192/70.23 |
| 2007/0221465 A1 | 9/2007 | Okada et al. | |
| 2014/0326570 A1 * | 11/2014 | Isobe | F16D 13/54 192/70.11 |

(Continued)

FOREIGN PATENT DOCUMENTS

| | | |
|---|---|---|
| EP | 3401564 A1 | 11/2008 |
| EP | 2037142 A2 | 3/2009 |

(Continued)

*Primary Examiner* — James J Taylor, II
(74) *Attorney, Agent, or Firm* — McGlew and Tuttle, P.C.

(57) ABSTRACT

A clutch (1) includes a housing (3) connected to a drive input member (5). First friction discs (7) are mounted in the housing and rotate therewith. Second friction discs (9) are mounted on a driven member (11). A pressure plate (13) is elastically stressed toward the driven member to compress the first and the second friction discs (7, 9) against one another. Cam profiles (31, 33) integral with the driven member and with the pressure plate, generate a thrust to move the driven member and pressure plate away from each other when it is necessary to reduce the pressure exerted by the pressure plate on the first and second friction discs. An angular stroke limiter limits the relative rotation between the driven member and the pressure plate and thereby limits the movement of the pressure plate away from the driven member).

7 Claims, 6 Drawing Sheets

(56) References Cited

U.S. PATENT DOCUMENTS

| | | | | |
|---|---|---|---|---|
| 2015/0041275 A1* | 2/2015 | Satou | ............... | F16D 13/56 |
| | | | | 192/66.31 |
| 2018/0313413 A1* | 11/2018 | Morishita | ............... | F16D 13/56 |
| 2020/0309242 A1* | 10/2020 | Kurematsu | ............ | F16H 55/16 |

FOREIGN PATENT DOCUMENTS

| | | | |
|---|---|---|---|
| EP | 2530348 | A1 | 12/2012 |
| JP | H0741109 | U | 7/1995 |
| JP | 2015155288 | A | 8/2015 |
| JP | 2018189106 | A | 11/2018 |

\* cited by examiner

CLUTCH

TECHNICAL FIELD

The invention relates to a clutch for transmitting torque in a vehicle, for example a vehicle with two or three wheels, such as a motorcycle or other saddle-ride vehicle. More specifically, embodiments described herein relate to a clutch with members that allow the torque transmitted to be reduced automatically when the speed of the driving wheel, operated by means of the clutch, tends to exceed the rotation speed of the engine.

BACKGROUND ART

In vehicles operated by an internal combustion engine, a clutch, which is disengaged to allow gear change, is arranged along the transmission.

Some prior art clutches are provided with a mechanism, in the form of suitable cams, which tend to open the clutch automatically if the driving wheel or wheels tend to rotate faster than the speed set by the engine. This occurs, for example, when the driver shifts from a higher gear to a lower gear while the vehicle is traveling at high speed, while simultaneously releasing the accelerator, reducing the flow of fuel to the engine. In this case the engine acts as a brake (known as "engine braking effect") and tends to brake the driving wheel or wheels.

In order to prevent an excessive braking effect from negatively affecting the vehicle driving, the clutch can be provided with a device adapted to reduce the torque transmitted through the clutch, when the speed of the driving wheel or wheels, and hence of the driven member of the clutch, tends to exceed the rotation speed of the drive input member of the clutch. The device comprises a pair of cam profiles which coact with each other to generate an axial movement of a driven member of the clutch away from a pressure plate that presses the friction discs against one another, so that they transmit the torque from the drive input member to the driven member by friction. The cam profiles are integral one with the driven member and the other with the pressure plate of the clutch. The axial movement of the driven member and pressure plate away from each other reduces the torque transmitted from the driving wheel toward the engine and thus reduces the engine braking effect.

A clutch of this type, according to the preamble of claim 1, is disclosed in EP2037142. This clutch has some drawbacks due to the fact that the axial stroke of the pressure plate relative to the driven member is limited by an axial stop.

SUMMARY

According to one aspect, there is provided a clutch for transmitting torque from an engine to a driving wheel of a vehicle, comprising a housing connected to a drive input member to rotate integrally therewith about a rotation axis of the clutch. First friction discs are rotatingly coupled to the housing and are intercalated with second friction discs rotatingly coupled to a driven member. The driven member is connectable to a drive output member to rotate integrally therewith. A pressure plate is mounted on the driven member and axially movable relative thereto parallel to the rotation axis of the clutch. The pressure plate is elastically stressed toward the driven member to compress the first discs and the second discs against one another. The clutch further comprises a first cam profile integral with the driven member, and coacting with a second cam profile integral with the pressure plate. The first cam profile and the second cam profile are configured so that, if a torque is transferred from the driven member toward the drive input member, the driven member rotates relative to the pressure plate about the axis of the clutch and the rotation movement between the driven member and the pressure plate generates, by means of the first cam profile and the second cam profile, an axial thrust on the pressure plate and an axial movement of the pressure plate away from driven member, reducing the pressure exerted by the pressure plate on the first discs and the second discs. To limit the axial movement of the pressure plate relative to the driven member, an angular stroke limiter is provided, which limits the relative rotation between the driven member and the pressure plate and thereby limits the movement of the pressure plate away from the driven member.

In this way, the movement of the pressure plate and driven member away from each other is obtained without the need for an axial stop, as instead is normally the case in prior art clutches, in which the axial load generated by the impact of the pressure plate against the axial stop is added to the axial load applied by the elastic member that presses the discs of the clutch against one another.

In practice, the angular stroke limiter defines a maximum relative rotation between the driven member and the pressure plate which can correspond to a maximum movement of the pressure plate and driven member away from each other such as to prevent coupling loss between driven discs and driven member.

In general, the angular stroke limiter can be configured in various ways and can comprise at least one pair of mutual stop elements, one integral with the driven member and the other with the pressure plate. These stops can be combined and arranged in any suitable way as a function of the structure of the driven member and of the pressure plate.

In particularly advantageous embodiments, the angular stroke limiter comprises at least one slot formed in the pressure plate and at least one first column of the driven member that extends approximately parallel to the rotation axis of the clutch and engages in the slot. The slot extends in a tangential direction around the rotation axis of the clutch and the size thereof in tangential direction defines the maximum stroke in axial direction of the pressure plate relative to the driven member under the thrust of the first cam and of the second cam. The relative rotation between the driven member and the pressure plate is limited by the first column abutting against the ends of the first slot.

In practical embodiments, several slots and several columns can be provided.

This arrangement is particularly advantageous as it allows an angular stroke limiter to be provided in a clutch that, in a known manner, comprises guide columns, which guide the movement of the pressure plate relative to the driven member, and around which elastic members are arranged, typically in the form of helical compression springs, which stress the pressure plate toward the driven member, pressing the friction discs against one another. In this way, a particularly compact configuration with a limited number of components is obtained.

Further advantageous features and embodiments of the clutch are defined in the appended claims, which form an integral part of the present description, and in the following description of exemplary embodiments.

BRIEF DESCRIPTION OF THE DRAWINGS

The invention will be better understood by following the description and the accompanying drawings, which illustrate a non-limiting example of embodiment of the invention. More in particular, in the drawing.

DETAILED DESCRIPTION

The clutch has a generally known configuration and operation and will be described briefly with reference to the main members, for a better understanding of the invention. The clutch is indicated as a whole with 1 and comprises a housing 3 rotatingly connected to a drive input member 5, in such a way that the housing 3 rotates integrally with the drive input member 5 about a rotation axis A-A of the clutch 1. An elastic joint 6 acting as flexible coupling element can be arranged between the drive input member 5 and the housing 3.

In the illustrated embodiment, the drive input member 5 is a gear, which can receive motion, directly or indirectly, from a drive shaft, not shown.

Figure 1:
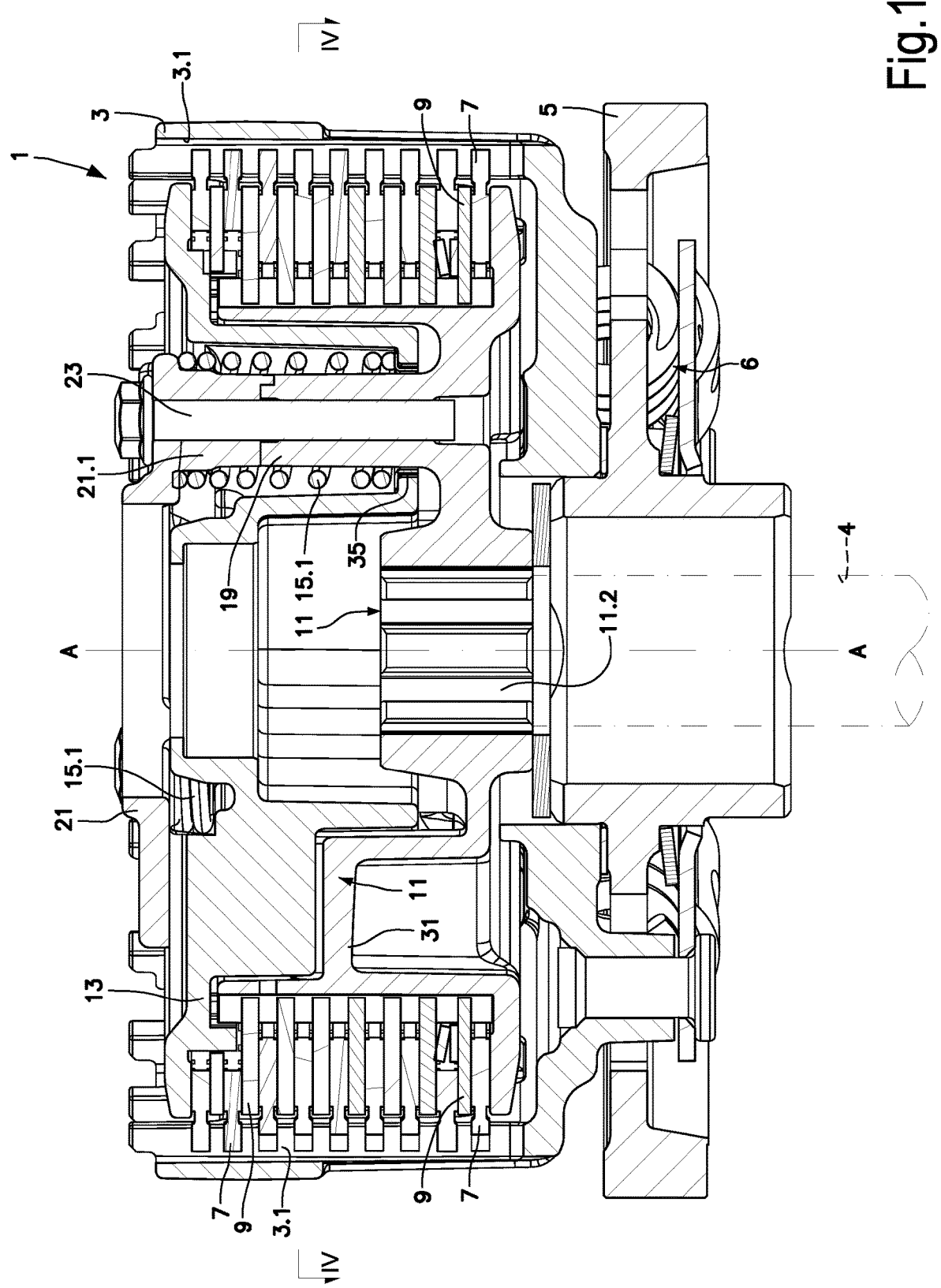
FIG. 1 shows a section of the clutch according to a plane containing the rotation axis of the clutch.
Figure 2:
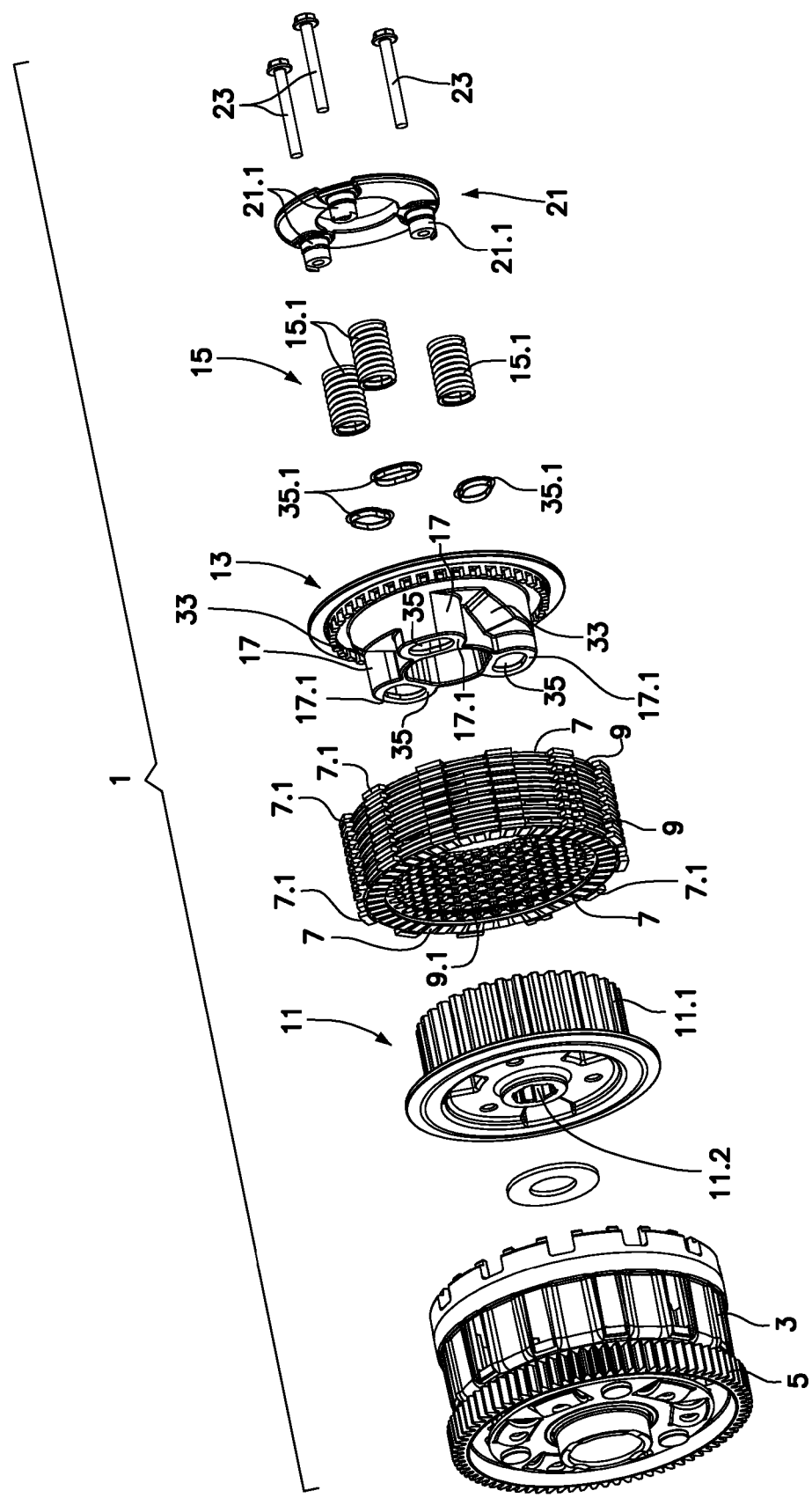
FIGS. 2 and 3 show exploded views of the main components of the clutch according to two view angles.

First friction discs 7 are mounted in the housing, coaxial to the housing 3 and rotatingly coupled to the housing 3 by means of radially external tabs 7.1, which engage in grooves 3.1 of the housing 3. The first friction discs 7 are intercalated with second friction discs 9, coaxial to the first friction discs 7. By means of a grooved profile 11.1 of the driven member 11 and respective internal teeth 9.1 of the second discs 9, these discs are rotatingly coupled to a driven member 11 of the clutch 1, coaxial to the housing 3. By pressing the discs 7 and 9 against one another a friction force is generated on the surfaces in mutual contact between the discs 7, 9, by means of which the torque is transmitted from the drive input member 5 to a drive output member 4 (shown only in FIG. 1). This latter can be mechanically connected to a gearbox, not shown, by means of which the torque is then transmitted to the driving wheel or wheels of the vehicle (not shown) with a suitable transmission ratio.

A grooved profile 11.2 of the driven member 11 rotatingly couples the drive output member 4 to the driven member 11.

The driven member 11 is mechanically connected to a pressure plate 13, coaxial to the driven member 11 and axially movable to move toward and away from the driven member 11, i.e., movable in a direction parallel to the rotation axis A-A of the clutch 1. In addition to a possible axial movement, the pressure plate 13 is provided also with a possible angular movement relative to the driven member 11. In other words, the driven member 11 and the pressure plate 13 can rotate relative to each other about the axis A-A of the clutch, for the purposes described below.

The pressure plate 13 is pushed toward the driven member 11 by means of elastic members 15. In the embodiment illustrated, the elastic members 15 comprise three helical compression springs 15.1 arranged parallel to the axis A-A of the clutch 1. Each compression spring 15.1 is housed in a respective seat 17 formed in the pressure plate 13. Each helical spring 15.1 surrounds a column 19 which is part of, or integral with, the driven member 11. Each spring 15.1 is maintained partially compressed between the bottom 17.1 of the respective seat 17 and a stop 21, which is rigidly connected to, or is part of, the driven member 11. More specifically, in the illustrated example the stop 21 is substantially annular in shape and has a plurality of protrusions 21.1 coaxial to the columns 19. Screws 23 extend coaxially to each protrusion 21.1 and to the respective column 19, so as to rigidly connect the stop 21 to the columns 19 and hence to the driven member 11.

While the illustrated embodiment shows a single stop 21 of annular shape to hold the three helical compression springs 15.1 in position, constrained to the three columns 19, three separate stops could also be used, each fixed to the respective column 19 by means of a proper screw 23.

In a manner known per se, the springs 15.1 generate a thrust of the pressure plate 13 against the assembly of the first discs 7 and second discs 9 and against the driven member 11. The pressure of the discs 7 against the discs 9 generates the friction force that allows the torque to be transmitted from the drive input member 5 to the driven member 11.

To disengage the clutch, for example to change the transmission ratio toward the driving wheel or wheels, in a known manner the pressure plate 13 can be moved away from the driven member 11 by means of compression of the springs 15.1. This movement can be controlled by an actuator, for example a manually controlled actuator, operated by means of a lever on the handlebar of a vehicle on which the clutch 1 is installed. The actuator can act directly on the pressure plate 13, moving it away from the driven member 11 with an axial movement.

The driven member 11 comprises at least one first cam profile 31, which coacts with at least one second cam profile 33 integral with the pressure plate 13. In the embodiment illustrated, in actual fact the driven member 11 comprises three first cam profiles 31, coacting with the same number of second cam profiles 33 integral with the pressure plate 13. The cam profiles are configured such that a mutual rotation about the axis A-A of the driven member 11 relative to the pressure plate 13 causes a thrust in axial direction between the driven member 11 and the pressure plate 13 oriented in a direction opposite to the thrust exerted by the springs 15.1. The thrust generated by the first and second cam profiles 31, 33 coacting with each other thus causes an axial movement of the pressure plate 13 away from the driven member 11. More precisely, the pressure plate 13 moves away from the driven member 11 moving relative to the housing 3 in a direction such as to compress the springs 15.1.

This axial movement occurs when the torque applied to the driven member 11 by the drive output member 4 exceeds the torque applied by the engine to the drive input member 5. This circumstance occurs, for example, when the driver of the vehicle engages a lower gear and releases the accelerator, so that the engine acts as brake (engine braking effect). In this circumstance, it is advisable for the clutch 1 to be able to slip slightly, reducing the torque transmitted therethrough and hence ultimately reducing the engine braking effect. This is obtained as a result of the thrust of the cam profiles 31 against the cam profiles 33 and consequent compression of the helical compression springs 15.1. The movement of the pressure plate 13 and the driven member 11 away from each other reduces the friction force transmitted by the second discs 9 to the first discs 7 and allows mutual sliding therebetween, with consequent rotation of the driven member 11 relative to the drive input member 5.

To prevent the movement of the pressure plate 13 and the driven member 11 away from each other in the direction of the rotation axis A-A from causing undesirable effects, it is advisable to provide a member for limiting this movement. For example, limiting the relative movement away from each other is advisable so that the outermost friction disc 9, i.e., farthest from the bottom of the housing 3, is prevented from leaving its position concentric with the axis A-A, which would otherwise make subsequent correct and complete re-engagement of the clutch not possible.

Characteristically, to limit the movement of pressure plate 13 and driven member 11 away from each other, an angular stroke limiter is provided, i.e., a limiter of the relative rotation between driven member 11 and pressure plate 13, i.e., a limiter of the angular stroke between driven member 11 and pressure plate 13. By limiting this rotation, and hence imposing a maximum angular misalignment between driven member 11 and pressure plate 13, this consequently limits the axial movement of the pressure plate 13 relative to the driven member 11, without the need for axial stops against which the pressure plate 13 impacts.

In the illustrated embodiment, the angular stroke limiter comprises a plurality of slots 35, each of which is provided in the bottom 17.1 of each seat 17. The respective column 19 of the driven member 11 extends through each slot 35.

Each slot 35 extends according to a tangential direction, i.e., is elongated according to a circumference which is co-axial with the rotation axis A-A of the clutch. When the driven member 11 tends to rotate relative to the pressure plate 13 about the rotation axis A-A, each column 19 tends to move along the respective slot 35 through which it extends. If there are no other constraints, the maximum mutual rotation between the pressure plate 13 (with which each slot 35 is integral) and the driven member 11 (with which the columns 19 are integral) is determined by the tangential extension of the slots 35. The size of each slot 35 in tangential direction, i.e., the angle subtended by the arc of circle representing the centerline of each slot, is such that the maximum movement of the columns 19 inside the slots 35 corresponds to a mutual axial movement between the pressure plate 13 and the driven member 11 that compresses the springs 15.1 without taking them to the condition of maximum compression. In any case, the axial movement is sufficient to cause a sliding between discs 7 and discs 9, but is sufficiently limited to prevent the last disc from displacing radially away from its correct position.

Figure 3:
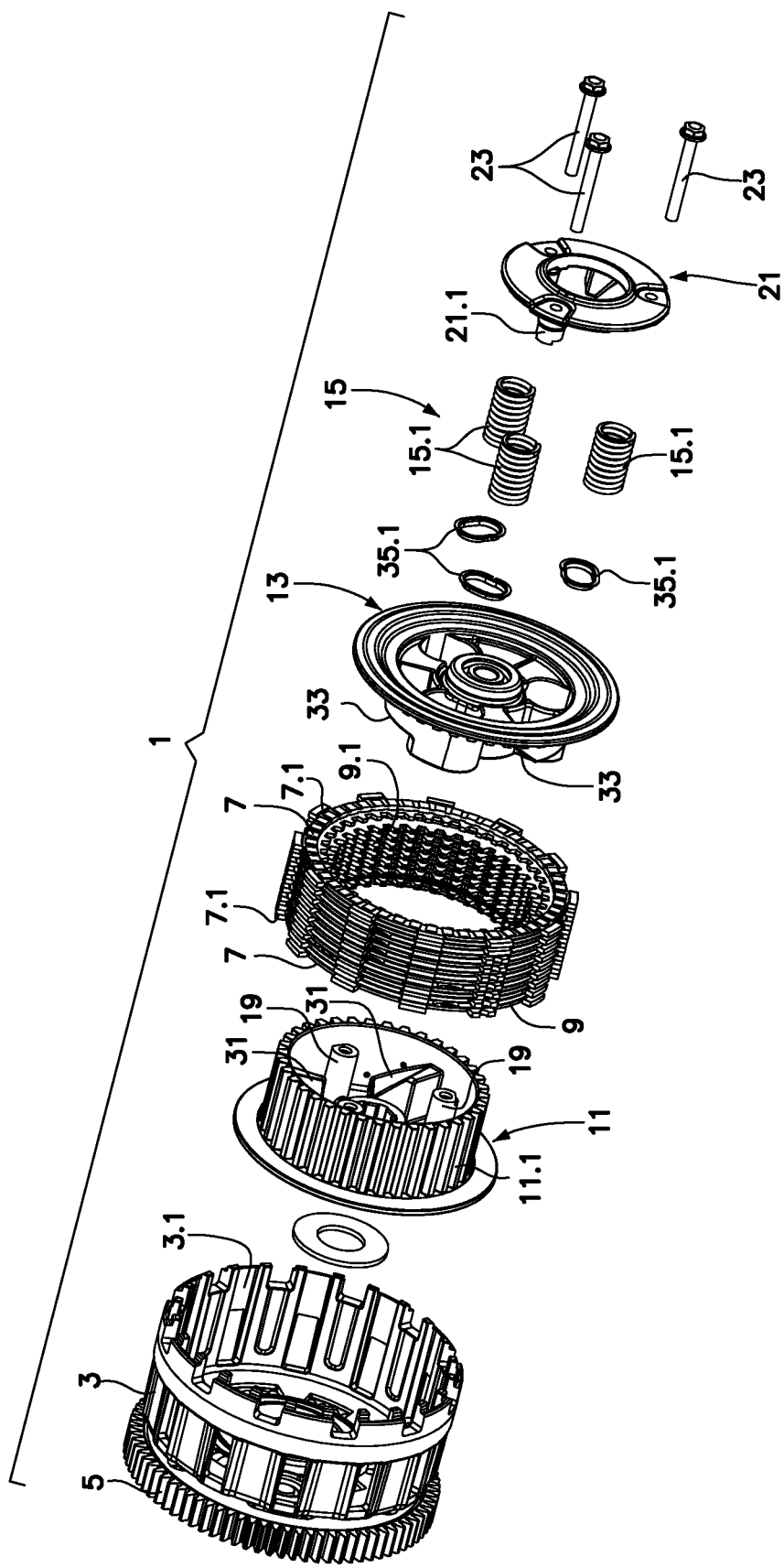
Figures 4, 5:
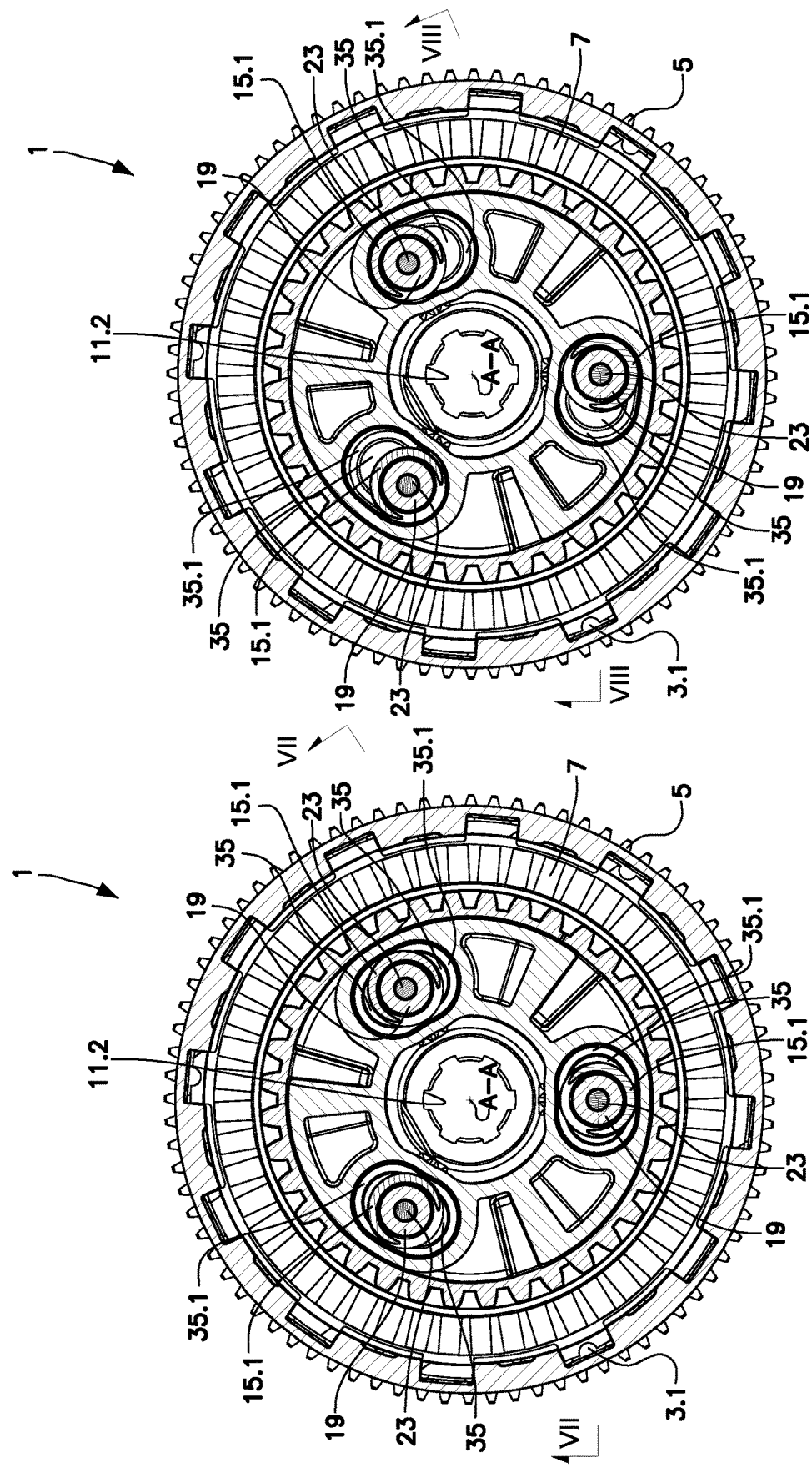
FIGS. 4 and 5 show sections according to a plane IV-IV of FIG. 1, orthogonal to the rotation axis of the clutch in two different operating conditions.
Figure 6:
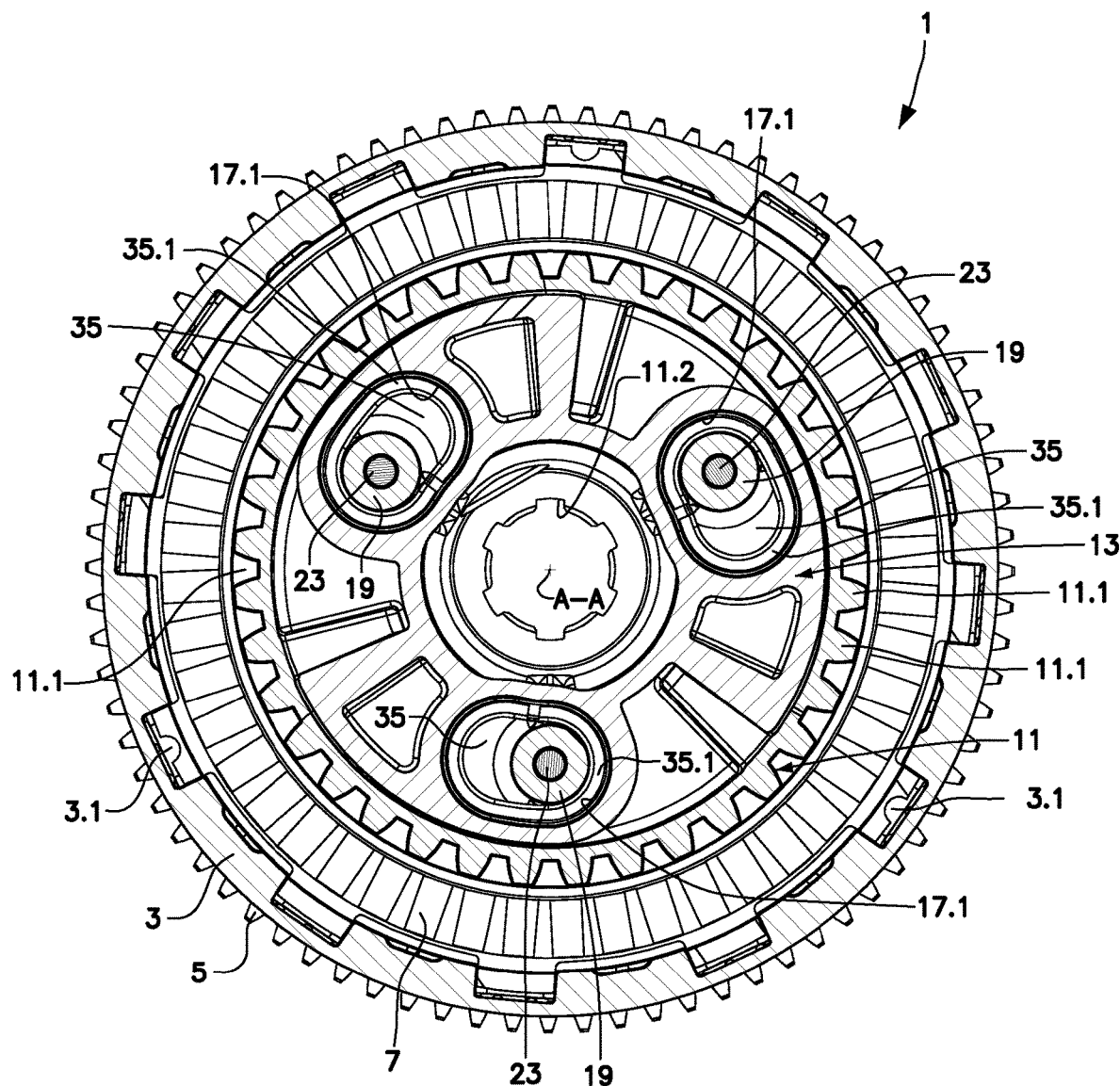
FIG. 6 shows the same section as FIG. 5, from which the springs have been removed.
Figure 7:
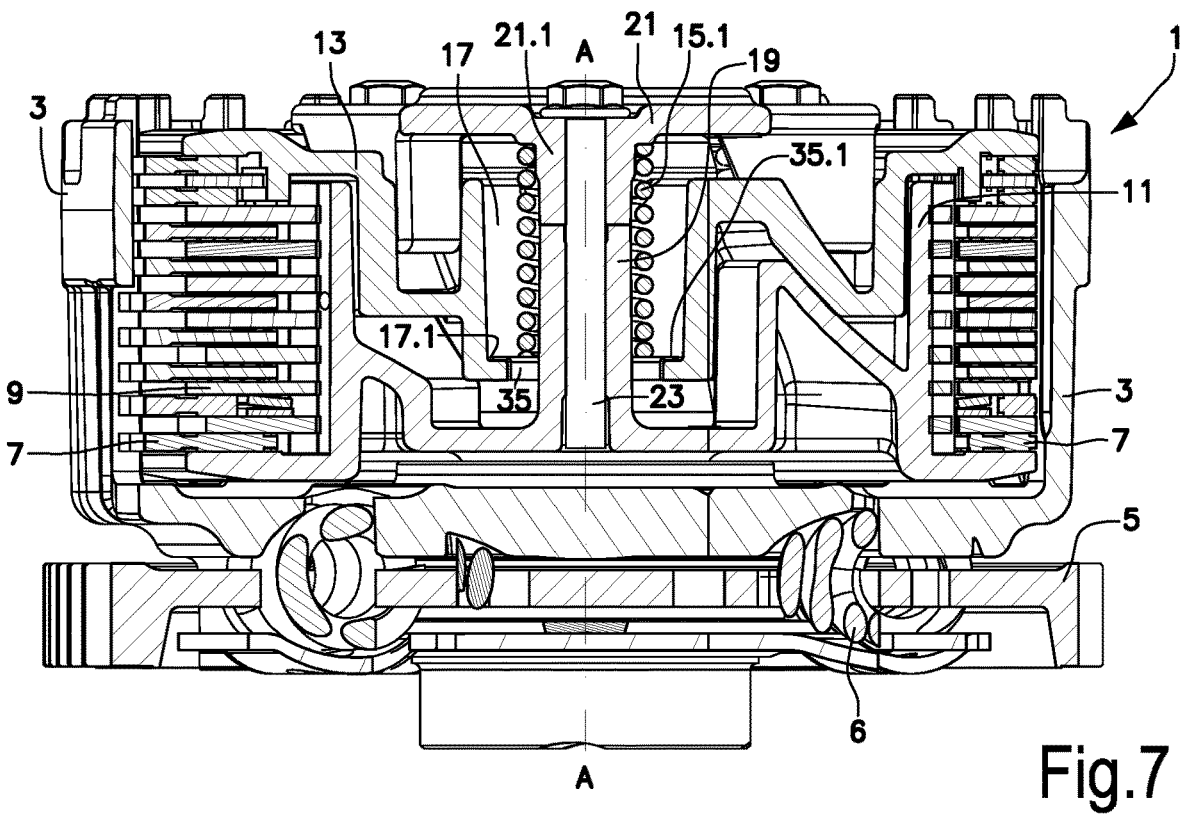
FIGS. 7 and 8 show sections according to the lines VII-VII and VIII-VIII of FIGS. 4 and 5, respectively.
Figure 8:
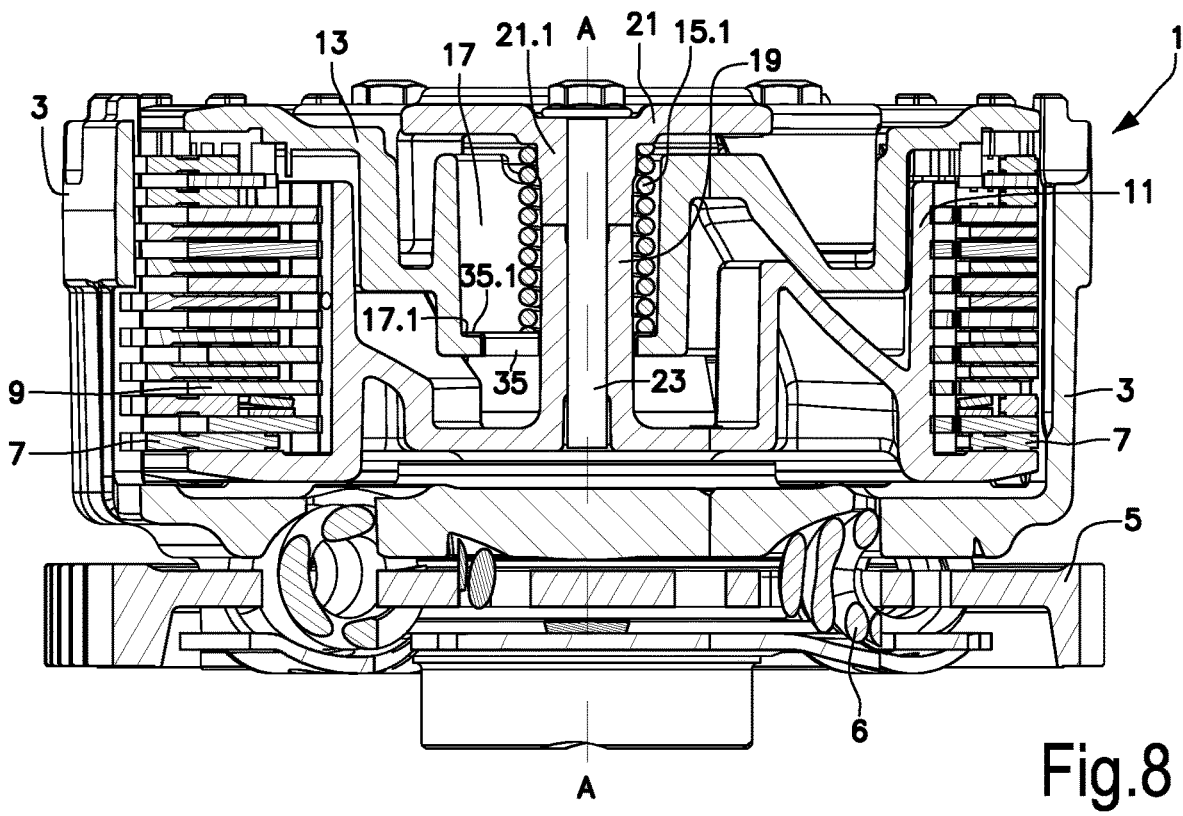

FIGS. 4, 5 and FIGS. 7 and 8 show, in a section transverse to the axis A-A and in a section according to the lines VII-VII and VIII-VIII, the two mutual positions of the slots 35 and of the columns 19 (and hence of the pressure plate 13 and of the driven member 11) in neutral conditions (FIGS. 3 and 7) and in a position of maximum mutual rotation (FIGS. 5 and 8, where the columns 19 are abutting against the respective ends of the slots 35.

It is understood that tangential size of the slots 35 is a function of the thickness of the discs 9 and in particular of the last disc 9, of the diameter of the columns 19 and of the inclination of the cam profiles 31, 33. In fact, the axial stroke of the pressure plate 13 relative to the driven member 11 is linked to the mutual rotation angle between pressure plate 13 and driven member 11 through the inclination of the cam profiles. The greater the inclination relative to a plane orthogonal to the rotation axis A-A is, the greater the axial movement will be, with the same angular movement.

To reduce impacts and consequent vibrations, it is advantageous for the edges of the slots 35 to be coated with an elastically yielding material, or in any case a material having an impact absorbing effect, as shown at 35.1.

In the embodiment illustrated in the drawings the three slots 35 and the three columns 19 are the same, in such a way that in practice three distinct stops for limiting the angular stroke of the driven member 11 relative to the pressure plate 13 are produced. This is advantageous for a more regular operation. However, it would also be possible, even having more than one column 19 and relative slots 35, for only one or only some of the slots 35 to act as tangential stop for limiting the angular stroke between driven member 11 and pressure plate 13. For example, only one of the three slots 35 can be provided to perform this function, while the other two can have a greater tangential extension, so that there is never any mutual contact between the edge of the slot 35 and the respective column 19.

The invention claimed is:

1. A clutch for transmitting a torque from an engine to a driving wheel of a vehicle, the clutch comprising:
   a housing connected to a drive input member to rotate integrally therewith about a rotation axis of the clutch;
   first friction discs mounted in the housing and rotating therewith;
   a driven member, on which there are mounted second friction discs coaxial to the first friction discs and intercalated there between; wherein the driven member is connectable to a drive output member to rotate integrally therewith;
   a pressure plate mounted on the driven member and axially movable relative thereto parallel to the rotation axis of the clutch; wherein the pressure plate is elastically stressed by a spring member toward the driven member to compress the first friction discs and the second friction discs against one another, and wherein a movement of the pressure plate away from the driven member causes a reduction of pressure between the first friction discs and the second friction discs;
   a first cam profile integral with the driven member and coacting with a second cam profile integral with the pressure plate; wherein the first cam profile and the second cam profile are configured so that, if a torque is transferred from the driven member toward the drive input member, the driven member rotates relative to the pressure plate about the rotation axis of the clutch and a rotation movement between the driven member and the pressure plate generates, by means of the first cam profile and the second cam profile, an axial thrust on the pressure plate and the movement of the pressure plate away from the driven member, reducing the pressure exerted by the pressure plate on the first friction discs and on the second friction discs;
   an angular stroke limiter adapted to limit the relative rotation between the driven member and the pressure plate and thereby limit the movement of the pressure plate away from the driven member;
   wherein the angular stroke limiter comprises at least one slot formed in the pressure plate and at least one first column of the driven member that extends parallel to the rotation axis of the clutch and engages in the at least one slot;
   wherein the at least one slot extends in an elongated tangential direction, shaped to coincide around the rotation axis of the clutch;
   wherein a size in the tangential direction of the at least one slot determines a maximum stroke in the axial direction of the pressure plate relative to the driven member under the axial thrust of the first cam profile and of the second cam profile, the relative rotation between the driven member and the pressure plate being limited by the at least one first column abutting against an end of the at least one slot;

wherein the angular stroke limiter defines a maximum relative rotation between the driven member and the pressure plate corresponding to a maximum movement of the pressure plate away from the driven member such as to prevent coupling loss between the second friction discs and the driven member; and wherein the said at least one slot has the size in the tangential direction such that a maximum movement of the at least one column inside the at least one slot correspond to a mutual axial movement between the pressure plate and the driven member that compresses the spring member without taking said spring member to a condition of maximum compression, and wherein the mutual axial movement is sufficient to cause a sliding between the first friction discs and the second friction discs around the rotation axis, the mutual axial movement is configured sufficiently small to prevent said first friction discs and second friction discs from becoming disengaged from the driven member and being displaced radially away from a correct operating position.

2. The clutch of claim 1, wherein the angular stroke limiter comprises at least one second slot formed in the pressure plate and at least one second column of the driven member that extends parallel to the rotation axis of the clutch and engages in the at least one second slot, and wherein the at least one second slot extends in the tangential direction around the rotation axis of the clutch; and wherein a size in the tangential direction of the at least one second slot determines the maximum stroke in the axial direction of the pressure plate relative to the driven member under the axial thrust of the first cam profile and of the second cam profile.

3. The clutch of claim 1, wherein the size in the tangential direction of the at least one slot is a function of a thickness of at least one of said first friction discs and second friction discs.

4. The clutch of claim 3, wherein the size in the tangential direction of the at least one slot is the function of the thickness of the at least one of said first friction discs and second friction discs which is closest to the pressure plate.

5. The clutch of claim 1, wherein the at least one slot has an edge coated in a material having a shock absorption function.

6. The clutch of claim 1, wherein the pressure plate has a seat around the at least one first column, said seat forming a volume for accommodating the spring member that pushes the pressure plate toward the driven member, the spring member being retained between the pressure plate and the driven member.

7. The clutch of claim 1, wherein the at least one slot has an edge coated with an elastically yielding material.

* * * * *